Nov. 13, 1962   M. BAERMANN   3,064,149
CONTROLLABLE FLUX PERMANENT MAGNET SYSTEMS, ESPECIALLY
FOR EDDY CURRENT BRAKES OR COUPLINGS FOR
POWER PROPELLED VEHICLES
Filed Jan. 29, 1958
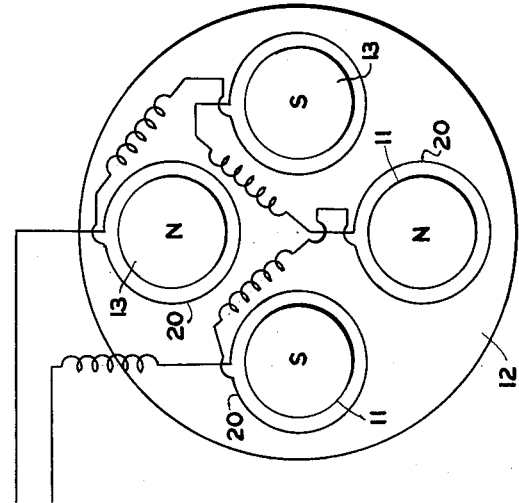
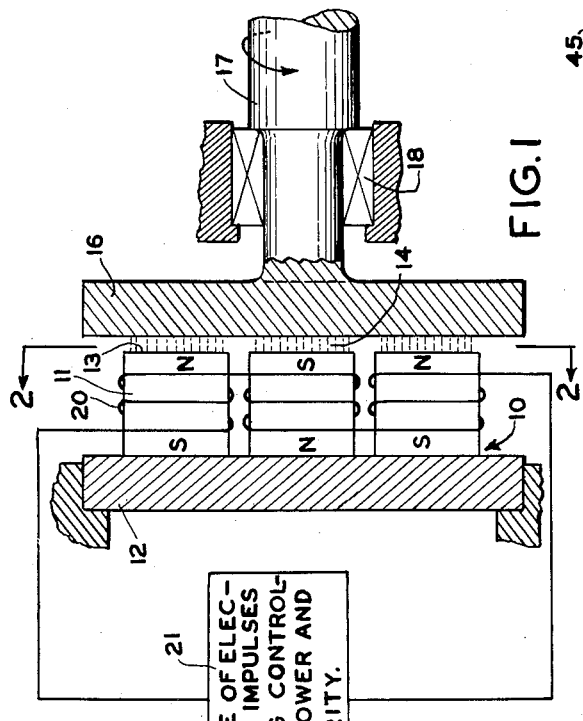
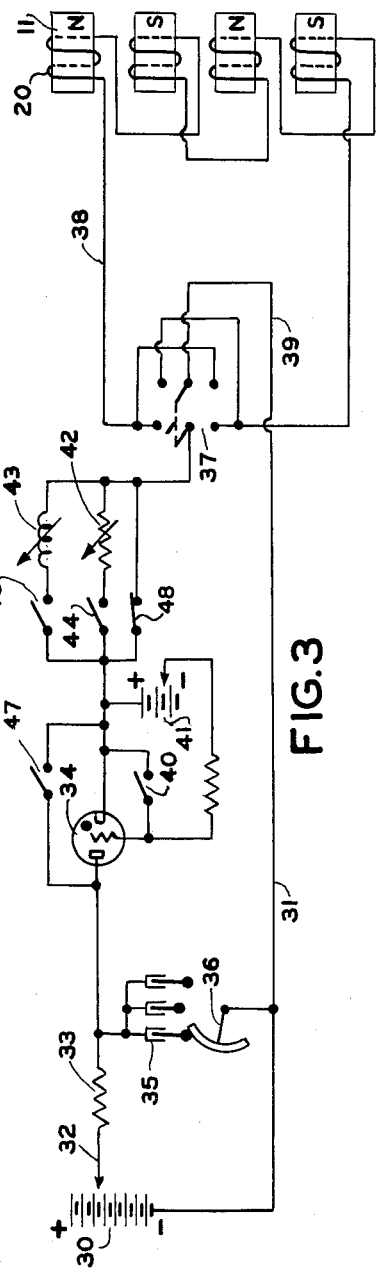
INVENTOR.
MAX BAERMANN
BY
Alfred G. Body
ATTORNEY United States Patent Office 3,064,149
Patented Nov. 13, 1962

3,064,149
CONTROLLABLE FLUX PERMANENT MAGNET SYSTEMS, ESPECIALLY FOR EDDY CURRENT BRAKES OR COUPLINGS FOR POWER PROPELLED VEHICLES
Max Baermann, Bensberg Wulfshof, Bezirk Koln (Rhine), Germany
Filed Jan. 29, 1958, Ser. No. 711,953
Claims priority, application Germany Feb. 1, 1957
2 Claims. (Cl. 310—93)

This invention pertains to the art of permanent magnet systems and more particularly to a permanent magnet system in which the magnetic flux may be controlled.

The invention is particularly applicable to the art of eddy current brakes or couplings, and will be described with particular reference thereto, although it will be appreciated that the invention has broader applications.

In the art of permanent magnet type eddy current brakes or couplings, the energizing or de-energizing of same has heretofore been accomplished usually either by: regulating the distance between the eddy current path and the permanent magnets which create the flux field; or by using the generated eddy currents to create a contra magnetic flux which is returned to the permanent magnets by means of magnetically permeable members.

With all of these systems, if it is to be completely de-energized, the apparatus must be unduly heavy. In the latter type of apparatus in which the eddy currents create contra magnetic fluxes, substantial magnetic losses occur which unduly reduce the efficiency of the apparatus when considered in reference to the volume and size of the permanent magnets employed. Also, with either type of apparatus, various control devices such as mechanical, hydraulic, or electric transmissions must be employed all of which cause an increase of weight and an increase of complexity.

The present invention contemplates a new and improved, variable flux permanent magnetic system which overcomes all of the above-referred to difficulties, and others which is simple in operation, readily controlled, and which has a high efficiency of operation.

In accordance with the present invention, a variable flux permanent magnetic system is provided comprised of a plurality of permanent magnets each adapted to produce a magnetic flux field, in combination with a coil for each magnet and a source of electrical current impulses of suitable size and direction in such coils as to permanently magnetize or de-magnetize the permanent magnets in desired amounts and provide a resultant flux field to effect the desired function.

By the term permanent magnet is meant a device or member which if subjected to either a temporary high magnetizing or demagnetizing force, will assume some state of magnetization, from maximum to zero state which is permanent until the next subsequent force changes it.

By a magnetizing or de-magnetizing impulse is meant an impulse of relatively short time duration sufficient when considered in relation to the magnitude as to alter the degree of permanent magnetization of the permanent magnet, as above defined, after the end of the time period.

Further, in accordance with the invention, an adjustable flux, permanent magnetic system is provided comprised of a plurality of permanent magnets each having a magnetic winding associated therewith which are energized from a source of dampened oscillating impulses whereby the state of permanent magnetization of the permanent magnet may be readily changed to zero.

The principal object of the invention is the provision of a new and improved permanent magnet system wherein the magnetic flux thereof may be readily varied.

Another object of the invention is the provision of a new and improved variable flux permanent magnetic system which is simple in construction, compact in size, light in weight, and does not require the use of mechanical, hydraulic, or electric transmissions for the purpose of varying the flux.

Another object of the invention is the provision of a new and improved variable flux permanent magnetic system wherein the flux is changed by means of subjecting the permanent magnets to a magnetizing or de-magnetizing force of sufficient magnitude to alter the degree of magnetization of the permanent magnets permanently at least until the application of a subsequent magnetizing or de-magnetizing force.

Still another object of the invention is the provision of a new and improved variable flux permanent magnetic system wherein the flux of the system may be readily reduced to zero.

Another object of the invention is the provision of a variable flux permanent magnetic system wherein the amount of flux may be automatically controlled.

The invention may take physical form in certain parts and arrangement of parts, preferred embodiments of which will be described in sufficient detail to enable one skilled in the art to readily duplicate the invention, and will be illustrated in the accompanying drawings, which form a part hereof, and wherein:

FIGURE 1 is a schematic side cross-sectional view of an eddy current brake illustrating a preferred embodiment of the invention;

FIGURE 2 is a cross-sectional view of FIGURE 1 taken on the line 2—2 thereof;

FIGURE 3 is a schematic wiring diagram of a power source for magnetizing and de-magnetizing the magnets of FIGURES 1 and 2.

Referring now to the drawings wherein the showings are for the purposes of illustrating an embodiment of the invention only, and not for the purposes of limiting same, FIGURE 1 shows a magnetic member indicated generally by the reference character 10, comprised of a plurality of permanent magnets 11 fixedly mounted in spaced relationship on a base 12. The permanent magnets 11 all have axes of magnetization so as to provide pole surfaces 13 remote from the base 12 so as to project a flux field indicated by the lines 14 outwardly therefrom for the purpose of coacting with an armature member 16 of either magnetically permeable or electrically conductive, or both, materials.

The armature member 16 may be either a member intended to be attracted towards the magnetic member 10 or in the preferred embodiment is in the form of a disc mounted on the end of a shaft 17 in turn rotatably supported in a bearing 18. As such, when the disc 16 rotates in the flux field 14, eddy currents will be generated therein and forces created opposing the rotation of the member 16 relative to the member 10.

Thus, the magnetic member 10 may be either rotatable, in which case the apparatus shown may be used as an eddy current coupling, or the magnetic member 10 may be fixed against rotation, as is shown, in which case the apparatus will be an eddy current brake.

Any number of permanent magnets 11 may be employed, 4 being shown. The magnets 11 may also assume any other shape, and may be disposed so as to face radially inwardly or outwardly, in which case the armature member 16 would become a cylinder having a surface facing either outwardly or inwardly in close spaced relationship with the pole surfaces 13 as the case may be.

As is known, the braking or coupling action between the magnetic member 10 and the armature member 16 is a function of the amount of flux 14 from the magnets 11 threading into the armature member as well as the relative speed of movement therebetween.

Thus, in one aspect of the invention, it is preferred that the maximum flux 14 be developed so as to provide the maximum braking or coupling action. The base 12 is thus preferably made of a magnetically permeable material to provide a return magnetic path for the permanent magnets 11.

The amount of spacing between adjacent magnets may be as desired, or as is known in the art, but should be sufficient so that there is a minimum of flux leakage between adjacent magnets and so that the maximum flux 14 threads into the armature member 16.

In accordance with the present invention, for the purpose of controlling the amount of flux 14, each permanent magnet 11 is provided with an electrical coil 20 having an axis parallel to the axis of magnetization of the magnet 11, and connected to a source of electrical impulses 21 having controlled power and polarity. The direction of winding of the coils, or the method of connecting such coils, is such that when electrical power flows in the coils the magnetic field of adjacent coils will be in opposite directions. Thus, in FIGURE 1 the coils are shown as connected in electrical series, and as being wound in opposite directions. In FIGURE 2, the coils are shown as being wound in the same direction, but with the terminals of adjacent coils reversed so that the current flow is in opposite directions.

The source 21, in accordance with the invention, must be capable of generating impulses of electrical energy which when considered in relation to the number of turns in each coil 20, and the duration of the pulses are capable of permanently effecting the state of permanent magnetization of the magnets 11. Thus, if it is desired to increase the flux 14, an impulse of electrical energy is sent through the coils 20 with such a polarity as to increase the magnetization shown, and of such a value that when the electrical power has ceased to flow, the state of magnetization in the magnets 11 will be increased in the desired amount. Alternatively, when it is desired to decrease the flux 14, the polarity of the pulse is reversed, and is of such a value that the state of magnetization of the magnets 11 will be permanently reduced, at least until the next subsequent impulse.

It is to be noted that relatively few turns of small diameter wire are required because it is possible to use electrical impulses of sufficiently high strength to create the required ampere turns. It is also to be noted that because it is already necessary to provide spacing between each of the magnets, the present arrangement does not require the increasing of the bulk of the apparatus over that required if the flux 14 were to always remain constant. It is also to be noted that the coils do not in any way increase the flux leakages between adjacent magnets.

It is to be further noted that the coils 20 may be connected in electrical parallel relationship so long as the direction of windings and/or the connection of the terminals to provide the proper direction of current flow are observed, as above pointed out.

It is to be further noted that if the strength of the magnets 11 is sufficient, the base 12 may be made of a magnetically non-permeable material. However, the return magnetic path provided by a magnetically permeable member is preferred.

In accordance with the invention, means are also provided for generating the current impulses. In one aspect of the invention, the impulse is generated in a known manner by the discharge of a condenser bank through a suitable switch such as grid-controlled gaseous tubes, or the like. By such an arrangement, an extremely high current of a very short duration can be obtained with a comparatively small total power consumption. Thus, the heating of the coils 20 can be held to a minimum. By such an arrangement, the continuous current load from a current source, such as a storage battery, generator, or the like, can easily be kept very low.

A schematic circuit diagram of apparatus for providing the desired power impulses is shown in FIGURE 3. Thus, in FIGURE 3 a D.C. power source in the form of a battery 30 is provided, having its negative terminal connected to a power lead 31. The other power lead 32 leads through an isolating resistor 33 to the anode of a grid-controlled gaseous tube 34, as well as to one terminal of a plurality of condensers 35, the other terminal of which is connected to the terminals of a rotary selector switch 36 in turn connected to the power lead 31. The cathode of the tube 34 is connected through a closed switch 48 to one terminal of a cross connected, double pole, double throw electrical switch 37, and the wire 31 is connected to the other terminal. This switch in turn is connected to wires 38 and 39 leading to the coils 20. By means of the switch 37, the polarity and direction of current through the coils 20 may be readily controlled.

Thus, in operation, the magnets 11 may have any desired state of permanent magnetization. The condensers 35 have been charged from the power source 30. When it is desired to change the state of permanent magnetization, the voltage on the grid of the tube 34 is varied either by closing the switch 40, or by adjusting the voltage applied to the grid from the battery 41 until the tube 34 becomes conductive. At this point, a current impulse of sufficient magnitude wil flow momentarily through the coils 20 to permanently effect the state of magnetization of the magnets 11.

It is to be noted that the dimensions of the permanent magnets 11 must be so selected that the opposing eddy currents in their magnetic field cannot build up to such a strength that their complete magnetization is endangered. In this respect, it is preferred to use a plurality of small single permanent magnets 11, which further offer the advantage of a high frequency eddy current effect in the armature member 16.

Further, in accordance with the invention, the desired strength of the current impulse which must differ according to the degree of magnetization or de-magnetization desired may be obtained in a number of different ways. For example, the charging voltage of the condenser bank 35 may be varied as by adjusting the point of connection of the wire 32 to the batteries 30. Alternatively, or additionally, the size of the condenser bank may be adjusted by properly positioning the selector switch 36.

It is also possible to employ an adjustable resistance 42 or an adjustable inductive resistance 43 in the coil circuit by opening the switch 48 and closing either the switch 44 or the switch 45, in series with the resistance 42 and the coil 43, respectively. Also, the coils 20 may be either connected in parallel or series. By adjusting either the resistance 42 or the inductive resistance 43, a stepless control may be obtained, particularly if a movable iron core is provided to adjust the inductive resistance 43.

It is also possible to flow the current impulse through only part of the coils 20 such that some of the magnets 11 will have a permanent state of magnetization distant from that of the others.

It will also be noted that by properly selecting the size of the impulse, it is possible to completely de-magnetize the permanent magnets 11.

Because it required a very accurate size of current impulse, if a permanent magnet is to be de-magnetized to a zero flux field, it is preferred that a dampened oscillating impulse be employed for this purpose rather than a direct voltage impulse. The circuit diagram of FIGURE 3 is adaptable for this purpose if the switches 48, 44 are opened, and the switch 45 closed. In this case, the condensers 35 will be discharged by closing of a switch 47 around the tube 34. Alternatively, a pair of tubes 34 may be connected back to back, as is conventional.

With such an arrangement, complete de-magnetization of the magnets may readily be effected, although in some cases, it is necessary to provide an additional supplementary, self-induction coil 43 in the magnetizing circuit in order to achieve this condition. Usually, however, the peak current strength must be always adjusted to a suitable value to provide the desired degree of demagnetization.

It is to be further noted that, in accordance with the invention, after the state of permanent magnetization of the permanent magnets has, for example, been increased to the maximum, it is still possible to flow a constant electrical current through the windings for the purpose of increasing the amount of flux 14 beyond that possible with the permanent magnets, or for obtaining a fine degree of control, either above or below that of the permanent magnetization.

With this arrangement, the continuous current is sufficiently low that heating of the coil 20 may be kept within permissible limits.

It is also advantageous in many cases to make the coils of aluminum wire because the high specific heat of aluminum leads to lower wire temperatures than when other materials are used.

In order to make it possible to use the customary devices for operating the brake or coupling according to the invention, operating devices such as hand wheels, levers or the like, are connected with contacts; for example, continuity-preserving contacts, which, if necessary, work through intermediate relays so that when the operating device is moved in the direction which indicates a switching-in or increasing of the brake or coupling moment, the polarity of the impulse is such as to increase the magnetization and when moved in the other direction, which develops a reduction or disconnection of the brake or coupling, the polarity of the impulse is such as to decrease the magnetization. When the operating device reaches the position corresponding to the desired brake moment, according to the invention, the movement of the operating device is stopped and the current impulse, which corresponds in size to the position of the operating device, flows through the coils 20 and is then disconnected, if necessary, by intermediate relays. Of course it makes no difference whether the intermediate relays are electromagnetic instruments with mechanical contacts or electronic switches. It is only important that these measures, according to the invention, make it possible to operate the brake or coupling in the easiest way by moving a lever or hand wheel or even a foot lever, so that all the necessary switching and adjusting processes result automatically without additional hand movements. Naturally it is also possible to control such a device according to the invention by electricity alone. It may even be considered desirable that a switch should so switch-in the device that the duration of connection is determined for the volume of the desired brake or coupling moment, and a second switch operates the disconnecting in the same way. With such a method of operating the device, according to the invention, it would be necessary to operate through known switching elements such as step-by-step switches, Kipp oscillators or the like, so that as long as the in or out switch is operated, a series of increasing magnetizing or de-magnetizing impulses passes through the magnetizing windings. The invention has been described with sufficient particularity to enable one skilled in the art to utilize the invention.

Obviously modifications of the embodiments of the invention differing radically from those described will occur to others upon a reading and understanding of this specification, and it is my intention to include all such modifications and alterations insofar as they come within the scope of the appended claims.

Having thus described my invention, I claim:

1. An eddy current coupling comprising in combination a magnetic member having a base and a plurality of of permanent magnets mounted thereon in spaced relationship with adjacent magnets having opposite magnetic polarization, an eddy current armature member in close spaced relationship with said magnets, said members adapted to magnetically couple a first member to a second member when said magnets are magnetized and to uncouple said first and said second members when said magnets are de-magnetized, and a means for controlling the magnetization of said permanent magnets, said means comprising a coil with a small number of turns associated with each magnet and connected to an electric power source with the polarization of adjacent coils being in opposite directions, said power source including means for supplying pulses of electric power to said coils at sufficient magnitude and polarity to selectively magnetize and de-magnetize said permanent magnets to couple and uncouple said first and said second members.

2. In an eddy current brake or coupling comprising in combination a magnetic member having a base and a plurality of permanent magnets mounted thereon in spaced relationship with adjacent magnets having opposite magnetic polarization, an eddy current armature member in close spaced relationship with said magnets, said members adapted to be magnetically coupled by the magnetic flux caused by said permanent magnets, the improvement comprising: a device for controlling the coupling between said members, said device comprising a coil with a small number of turns associated with each magnet and with the polarization of said coils being in opposite direction; a pulsable electrical power source connected to said coils; means for selectively pulsing said source to cause an electric signal of sufficient magnitude to substantially change the magnetization of said permanent magnets; and a means for controlling the polarization of said electric signal so that said magnets are selectively magnetized and de-magnetized.

References Cited in the file of this patent

UNITED STATES PATENTS

| 704,574 | Pintsch | July 15, 1902 |
| 2,504,996 | MacDonald | Apr. 25, 1950 |
| 2,607,813 | Reijnst | Aug. 19, 1952 |
| 2,708,737 | Skidmore | May 17, 1955 |
| 2,902,612 | Whearley | Sept. 1, 1959 |

FOREIGN PATENTS

| 142,932 | Australia | Aug. 15, 1951 |